(12) United States Patent
Wandmacher et al.

(10) Patent No.: US 6,340,794 B1
(45) Date of Patent: Jan. 22, 2002

(54) STRESS CONTROL FOR TERMINATION OF A HIGH VOLTAGE CABLE

(75) Inventors: Robert A. Wandmacher, Cedar Park; Lawrence C. Chor; John T. Larson, both of Austin, all of TX (US)

(73) Assignee: Minnesota Mining and Manufacturing Company, St. Paul, MN (US)

( * ) Notice: Subject to any disclaimer, the term of this patent is extended or adjusted under 35 U.S.C. 154(b) by 991 days.

(21) Appl. No.: 08/763,390

(22) Filed: Dec. 16, 1996

Related U.S. Application Data

(63) Continuation-in-part of application No. 08/524,236, filed on Sep. 6, 1995, now abandoned.

(51) Int. Cl.$^7$ ............................................. H02G 15/064
(52) U.S. Cl. ...................................................... 174/73.1
(58) Field of Search ........................ 174/73.1, 76, 127, 174/140 R, 140 C, 140 CR (56) References Cited

U.S. PATENT DOCUMENTS

| | | | |
|---|---|---|---|
| 2,373,843 A | | 4/1945 | Nicholas ..................... 174/73.1 |
| 3,356,788 A | * | 12/1967 | Callahan et al. ............ 174/73.1 |
| 3,377,420 A | | 4/1968 | Brown et al. .................. 174/73 |
| 3,515,798 A | | 6/1970 | Sievert ........................ 174/135 |
| 3,539,703 A | | 11/1970 | Cloud ........................... 174/19 |
| 3,828,115 A | | 8/1974 | Hvizd, Jr. .................... 174/73.1 |
| 3,846,578 A | * | 11/1974 | Bahder et al. ............. 174/88 R |
| 4,187,389 A | | 2/1980 | Foote et al. ................. 174/73.1 |
| 4,363,842 A | | 12/1982 | Nelson .......................... 428/36 |
| 4,378,463 A | | 3/1983 | Senior et al. ............... 174/73.1 |
| 4,383,131 A | | 5/1983 | Clabburn .................... 174/73.1 |
| 4,431,861 A | | 2/1984 | Clabburn et al. ........... 174/73.1 |
| 4,470,898 A | | 9/1984 | Penneck et al. .............. 252/511 |
| 4,551,915 A | | 11/1985 | Larsson ......................... 29/858 |
| 4,714,800 A | | 12/1987 | Atkins et al. ............... 174/73.1 |
| 4,738,318 A | | 4/1988 | Boettcher et al. .......... 174/73.1 |
| 5,171,940 A | * | 12/1992 | Vallauri ...................... 174/73.1 |
| 5,280,136 A | | 1/1994 | Yaworski et al. .......... 174/73.1 |
| 5,294,752 A | | 3/1994 | Vallauri et al. ............ 174/73.1 |

FOREIGN PATENT DOCUMENTS

| | | |
|---|---|---|
| DE | G 82 36 151.7 | 12/1982 |
| EP | 0 121 986 A1 | 10/1984 |
| EP | 0 147 978 | 12/1984 |
| FR | 2 371 804 | 11/1976 |
| FR | 2371804 | 11/1976 |
| FR | 2 466 022 | 7/1978 |
| FR | 2 518 837 | 12/1981 |
| WO | WO 84/03993 | 10/1984 |

OTHER PUBLICATIONS

Study of Dielectrical Properties of a New High Permittivity Material, Pingkai et al., Proceedings of Electrical/Electronics Insulation Conferenc, Rosemont, IL, Sep. 1995.*
A new Family of M.V. Terminations, Brackeniers et al., Alcatel Cable Accessories, Belgium, Nov. 1993.*
L.F. Rochmann, Terminals and Joints for Insulated Power Cables, AIEEE Miscellaneous Paper 50–54, Dec. 1949.
C.E. Mercier and W.E. Elliott, Analysis and Elimination of Corona Effects, Electrical manufacturing Magazine, Gage Publishing Co., all pages, Nov. 1957.
U. Boehm, C. Brackeniers, A. Cheenne–Astorino of Euromold GmbH, Germany, Kaltschrumpfende Kabelgarnituren fur Mittelspannungskabel, Elektrotechnische Zeitschrift, vol. 8/1995, pp. 18–25.

* cited by examiner

Primary Examiner—Kamand Cuneo
(74) Attorney, Agent, or Firm—Arthur J. Brady (57) ABSTRACT

A two-part system for electrical stress control includes a conformable stress control material positioned at the shield cut edge of a prepared power cable and a stress control tube over the conformable stress control material. A second region of conformable stress control material is positioned adjacent the cut end of the insulation. Relationships are revealed which relate the permittivity and dimensional parameters of the two components.

8 Claims, 5 Drawing Sheets

STRESS CONTROL FOR TERMINATION OF A HIGH VOLTAGE CABLE

This application is a Continuation-in-Part of application Ser. No. 08/524,236, filed Sep. 6, 1995 now abandoned.

FIELD OF THE INVENTION

The present invention relates to electrical stress control and more particularly to a method and an arrangement to control electrical stress in a region of high electric field strength associated with high voltage electrical equipment.

BACKGROUND OF THE INVENTION

It is well known to employ stress control means to control electrical stress in a region of high electrical field strength due to a shield discontinuity in high voltage cable or electrical equipment, for example, electrical bushings, and joints or terminations of high voltage cables. Such stress control means typically comprise stress cones and tapes or tubular articles of semi-conductive stress control material. This invention is directed to stress control means comprising high permittivity stress control material and provides improved corona discharge extinction, power frequency voltage withstand and impulse voltage withstand performance over prior art arrangements using such stress control means. For purposes of illustration, this invention is described primarily as it applies to a termination of a high voltage cable. The invention can be applied, however, to other electrical cable or equipment where stress control is desired.

A typical high voltage cable includes an inner conductor surrounded by a conductor shield which is, in turn, surrounded by an insulating material that is surrounded by an outer electrically semi-conductive shield, in some instances, and metal shield. In terminating such a cable, it is customary to remove or cut back each successive layer of the cable to expose the layer below. Cutting back the electrically semi-conductive shield causes a discontinuity in the electric field resulting in high electric stress at the end of the shield. The high electrical stress can cause electrical discharges to occur, which in turn tend to cause breakdown of the insulation of the cable. The high electrical stress can be controlled by electrical stress control means.

High-voltage alternating current cable terminations are generally tested in the U.S. under the IEEE standard test procedure Std. 48-1990. This procedure sets forth, inter alia, design tests to be performed by the manufacturer to obtain information on the performance of a high voltage cable termination.

The design tests of the IEEE procedure that are particularly useful in determining the effectiveness of a termination which includes a stress control arrangement include the "Partial Discharge (Corona) Extinction Voltage Test," the "Power Frequency Voltage Withstand Test" and the "Lightning Impulse Voltage Withstand Test." In the discharge extinction voltage test, electrical discharge in the termination is measured at specific applied voltages and has to be below specific values. Also the voltage at which the discharge extinguishes is measured and has to be above specific values. In the power frequency voltage withstand tests the specified voltage is applied to the cable and should be withstood without flashover or other dielectric breakdown. In the impulse voltage withstand test, impulses of specific value and waveform are applied to the cable and should be withstood without flashover or other dielectric breakdown. The voltage at which flashover occurs should be above specific values. The discharge, power frequency voltage and impulse voltage performance of the termination should meet the requirements set forth in the IEEE Standard Test procedures STD 48-1990.

The use of stress control material in high voltage cable terminations does not always produce terminations that meet the impulse performance requirements of the IEEE test procedures. In order to meet this requirement the stress control arrangement may be augmented by the use of rain sheds. While sheds are typically employed with outdoor terminations for other purposes, they are not generally employed when the cable termination is installed indoors. Since the use of sheds adds to the cost of the termination and requires additional space around the cable, it is desirable to be able to dispense with the use of the sheds yet still meet the desired impulse performance.

The present invention, provides a novel arrangement that significantly improves the termination's discharge, power frequency voltage and impulse voltage performance with or without the use of sheds. While the present invention is primarily described in connection with a termination of a cable, it is suitable for employment with high voltage cable joints and other high voltage equipment including electrical bushings and feedthroughs.

SUMMARY OF THE INVENTION

The present invention includes an elastically recoverable elastomeric insulating sleeve which is provided with an inner support or "core" which holds the sleeve in a stretched condition. The sleeve is placed over the power cable and the core is unwound and removed, allowing the sleeve to contract into contact with the cable. Between the sleeve and the core is disposed a two-part stress control system consisting of a non-tacky, void-filling conformable stress control material surrounded by an elastomeric stress control tube. Both the conformable stress control material and the stress control tube have high permittivity (greater than 10). "Permittivity" is synonymous with dielectric constant and is the ratio of electric flux generated by an electrical field in a medium to that generated by the field in a vacuum.

The present invention defines relationships among the permittivities of the conformable stress control material and the stress control tube, the thicknesses of both members, and the length the conformable stress control material extends from the edge of the semi-conductive shield layer of the cable.

In a first embodiment of the invention, conformable stress control material is disposed in contact with the cut end of the cable shield and extends along the cable insulation. In a second embodiment of the invention, a conformable stress control material is also in contact with the cut end of the cable insulation and lug.

BRIEF DESCRIPTION OF THE DRAWINGS

The present invention will be described with respect to the accompanying drawings, wherein like numbers refer to like parts in the several views, and wherein.

DESCRIPTION OF THE PREFERRED EMBODIMENT

Figure 1:
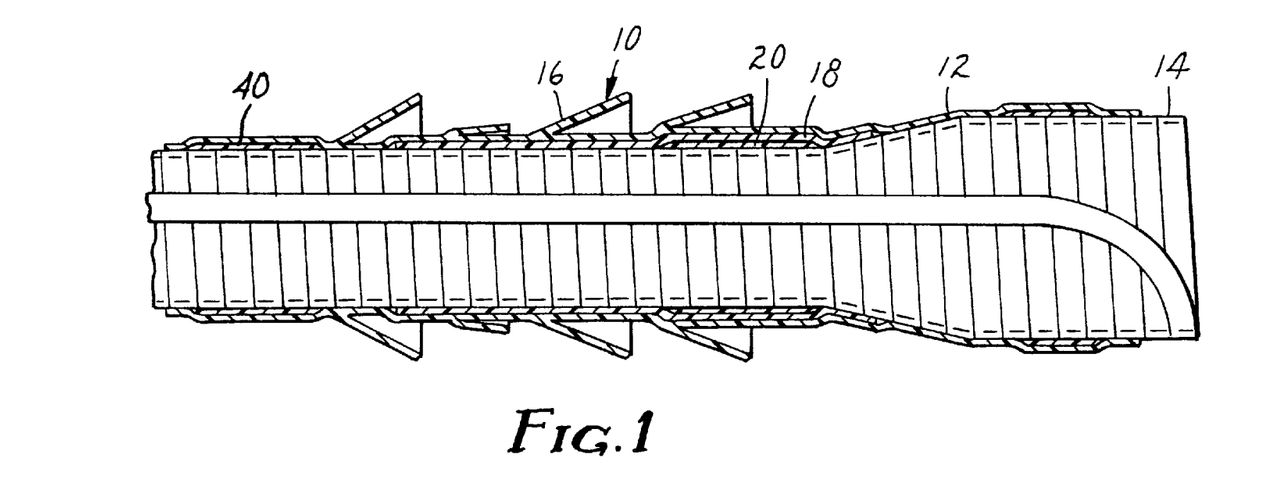
FIG. 1 is a cross-sectional view of a stress control termination sleeve of the present invention with rain sheds.

FIG. 1 illustrates a termination assembly, generally indicated as 10, according to one embodiment of the present invention. The assembly 10 is a pre-stretched tubular sleeve 12 supported in the stretched condition by an easily removable core 14. The assembly 10 is typically designated a "PST", which stands for pre-stretched tube. Such an assembly 10 is taught in U.S. Pat. No. 3,515,798, incorporated herein by reference. Preferably the core 14 is a one-piece rigid spiral core having interconnected adjacent coils in a closed helical configuration, as described in U.S. Pat. No. 3,515,798. The outer sleeve 12 is preferably silicone rubber, although a wide variety of materials may be used so long as they possess the required arc and track resistance, ultraviolet resistance and ability to stretch and recover substantially their original dimensions when the core 14 is removed.

Figure 2:
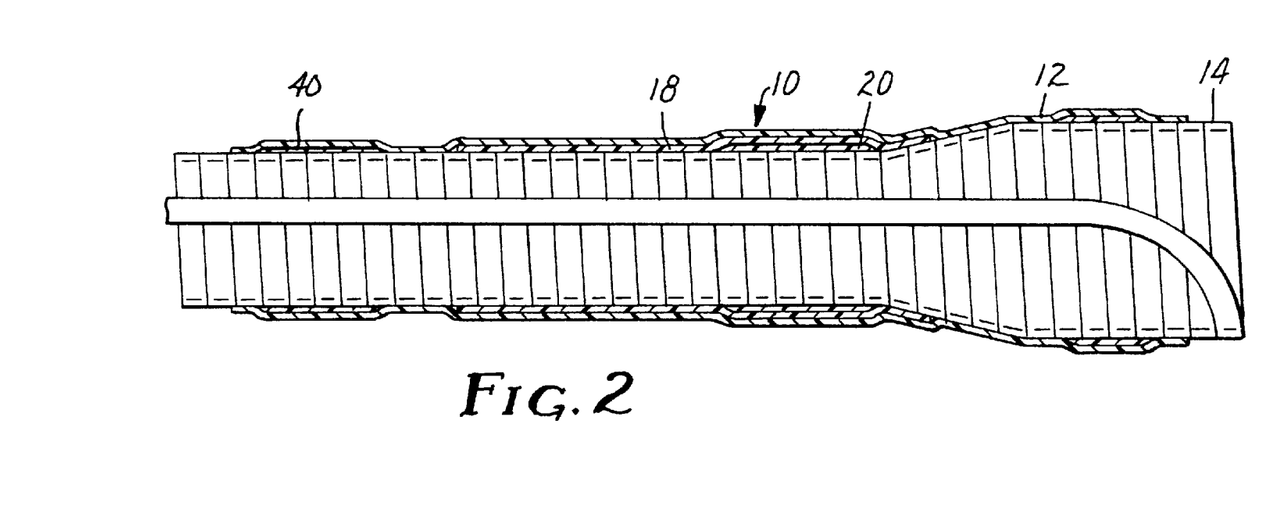
FIG. 2 is a cross-sectional view of the stress control termination sleeve of the present invention without rain sheds.
Figure 3:
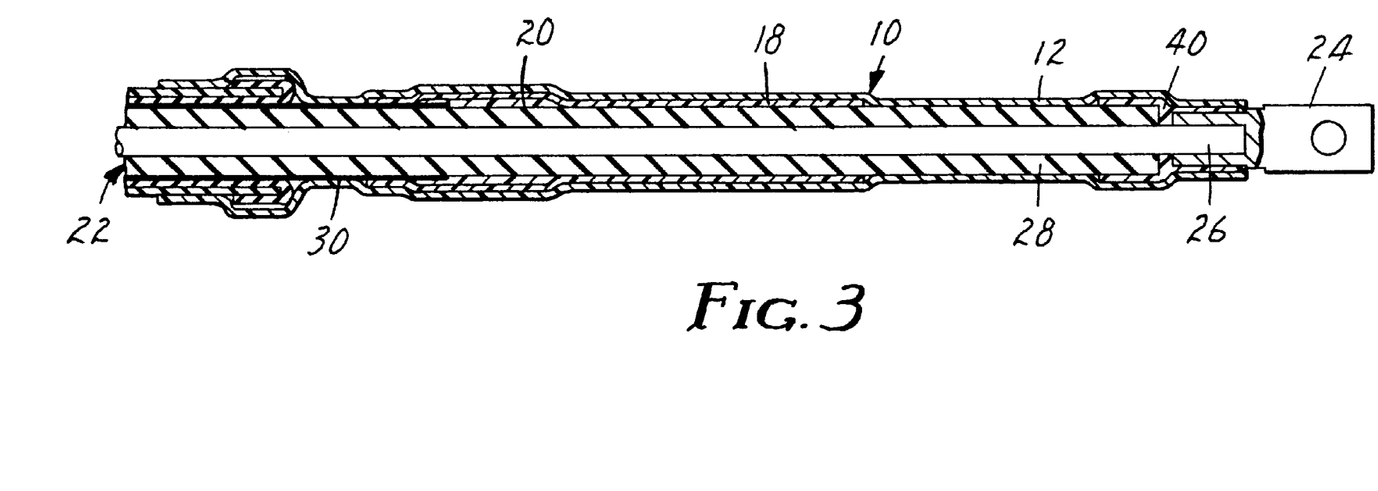
FIG. 3 is a cross-sectional view of the stress control termination sleeve of the present invention as applied to an electrical power cable.

The termination assembly of FIG. 1 is primarily intended for outdoor use and so includes rain sheds 16 which increase the tracking length along the length of the sleeve 12. Space is usually more critical in indoor applications, so the rains sheds 16 are usually dispensed with in these situations, as shown in FIG. 2. Either termination assembly 10 is applied as shown in FIG. 3 to an electrical power cable 22 which has a suitable terminating device such as the lug 24 shown crimped to the conductor 26 of the cable 22.

To apply the lug 24 and thus terminate the cable 22, the cable 22 must be prepared by removing a predetermined length of insulation 28 covering the conductor 26 and a greater predetermined length of semi-conductive shielding 30 covering the insulation 28. Cutting back the shield 30 causes a discontinuity in the electrical field surrounding the conductor 26 which results in high electrical stresses an the end of the shield 30. The high stress can cause electrical discharge to occur, which in turn may cause breakdown of the insulation 28 of the cable 22 or the termination sleeve 12. The present invention is intended to control these high electrical stresses to avoid these undesirable results.

Electrical stress control in the preferred embodiment is provided in the termination 10 by the combined use of a high permittivity stress control tube 18 lining a portion of the sleeve 12, and a conformable stress control material 20 within the stress control tube 18. The thicknesses of the stress control tube 18 and the conformable stress control material 20, the length of the conformable stress control material 20 and the permittivity of both the stress control tube 18 and the conformable stress control material 20 are controlled to accomplish the desired stress control within the termination assembly 10.

The high permittivity stress control tube 18 is described generally in U.S. Pat. No. 4,363,842, which is incorporated herein by reference. The article taught in that patent has been modified somewhat to produce the preferred stress control tube 18 defined by the following composition:

| | Parts by Weight |
|---|---|
| Nordel 1470 (Tradename for an ethylene/propylene/diene monomer rubber commercially available from Dupont) | 50 |
| Nordel 1440 (Tradename for an ethylene/propylene/diene monomer rubber commercially available from Dupont) | 50 |
| Zinc oxide (French Process) | 5.0 |
| ARO60 Carbon Black (a N754 grade, large particle size carbon black commercially available from J.M. Huber) | 71.35 |
| 4X Mineralite Mica (commercially available from Thompson Hayward Chemical) | 20 |
| D-148 (Tradename for a processing aid commercially available from Ventron | 2.0 |
| Struktol WB-16 (Tradename for a mixture of fatty acid soap, predominantly calcium, available from Struktol Company) | 2.0 |
| EF (A-172) D-50 (Tradename for a vinyl silane coupling agent predispersed on a hydrocarbon wax commercially available from Elastochem) | 1.0 |
| Sunpar 2280 (Tradename for a paraffinic process oil commercially available from the Sun Company) | 9.8 |
| Plasthall DOZ (Tradename for Di-2-Ethylhexyl Azelatecommercially available from C.P. Hall Co.) | 13.3 |
| Plasthall DIDG (Tradename for Diisodecyl Glutarate commercially available from C.P. Hall Co.) | 13.3 |
| Silvex 113-20-C (Tradename for a mineral oil treated aluminum flake of 22 micron average particle diameter commercially available from Silberline Manufacturing) | 8.5 |
| Drimix SR-297-75E (Tradename for 1,3 butylene dimethacrylate dispersion commercially available from Kenrich petrochemicals) | 7.0 |
| E (VC) D-40 (Trade name for a difunctional peroxide dispersion commercially available from Elastochem) | 4.5 |

The conformable stress control material 20 is described in U.S. patent application Ser. No. 08/524,390 filed on like date as parent patent application Ser. No. 08/524,236. This patent application is herein incorporated by reference. The conformable stress control material 20 is comprised of a resin component which consists of a blend of two polymeric resins; epihalohydrin polymers and insulating polymers having an electrical dissipation factor (tan δ) of less than 1.

Epihalohydrin polymers suitable for use are the elastomeric polymers of an epihalohydrin in homopolymer or copolymer form. Such polymers are prepared by polymerization of the monomeric material in mass or in solution with organometallic catalysts, and may be homopolymers, copolymers, terpolymers, etc. Examples of homopolymers include epichlorohydrin, or epibromohydrin; useful copolymers include copolymers of epihalohydrins with alkylene oxides, and copolymers with epoxides, e.g., propylene oxide, ethylene oxide, butene oxide, and epoxy ethers such as ethylglycidyl ether, allylglycidyl ether and the like. Such polymers are available from Zeon Chemicals, Inc.

Preferred epihalohydrin polymers include copolymers with alkylene oxides, particularly ethylene and propylene oxides.

The resin component also contains an insulating polymer having a tan δ of less than one. Useful polymers include silicone, EPM or EPDM and hydrocarbon rubbers. Useful silicones include silicones which are fluid at room temperature and gum silicones; gum silicones are preferred for easy compounding and processability; most preferred are those gum silicones having a durometer of about 30.

Commercially available silicone elastomers include those fluid silicones available as Dow Corning DC 10,000, and the like, and gum silicones available as Elastosil® R300/30 from Wacker Silicones Corporation, and Silastic® GP31 from Dow Corning, and the like.

This formulation produces a non-tacky, conformable stress control material 20 comprising:

a) about 100 parts of a resin component containing
   1) from about 20% to about 80% of an epihalohydrin polymer, and
   2) correspondingly, from about 80% to about 20% of an insulating polymer having a tan δ of less than one, b) from about 8 to about 200 parts of a filler selected from the group consisting of barium titanate and hydrated aluminum silicate, and c) from 0 to 30 parts of a plasticizer.

Preferred non-tacky electrical stress control materials comprise:

a) about 100 parts of a resin component containing
   1) from about 20% to about 80% of an epihalohydrin polymer, and
   2) correspondingly, from about 80% to about 20% of a silicone polymer having a tan δ of less than one, b) from about 8 to about 200 parts barium titanate, and c) from 0 to 30 parts of a plasticizer.

As stated earlier, the highest electrical stress of a prepared cable 22 occurs at the cut back end of the semi-conductive insulation shield 30. The present invention coordinates two components held to specific relative geometries based on their permittivities to provide stress control.

The inner conformable stress control material 20 is positioned to extend in both directions from the cut edge of the shield 30 and should have a thickness sufficient to fill the radial step from the outer surface of the cable insulation 28 to the outer surface of the shield 30. The stress control tube 18 covers the conformable stress control material 20 and extends beyond the conformable stress control material 20 in both directions from the edge of the shield 30.

The maximum internal electrical stress at the cable insulation 28 is primarily affected by the permittivity of the conformable stress control material 30. The relationship to predict the maximum stress is:

$$S_{internal\ maximum} = (V/(R \ln (R/r)))A$$

where:

$$A = 1.69 - 1.63 \times 10^{-2} \epsilon_p;$$

V is the applied voltage;
R is the outside radius of the cable insulation;
r is the inside radius of the cable insulation; and
$\epsilon_p$ is the permittivity of the conformable stress control material.

The permittivity of the conformable stress control material must be high enough to prevent its breakdown at the maximum power frequency voltage withstand required for the cable and its attached termination to achieve the required voltage rating in accordance with industry standard tests. The breakdown strengths for the conformable stress control materials tested were about 11800 V/mm. The minimum values for the permittivity of the conformable stress control material at selected voltage levels are shown in the table below:

| Voltage Class (kV) | Power Frequency Voltage Withstand (kV for 1 minute) | V/(R ln (R/r))$_{max}$ for 2500 MCM (V/mm) | $\epsilon_p$(min) for $V_{BD}$ = 11800 V/mm |
|---|---|---|---|
| 5.0 | 25 | 10450 | 34 |
| 8.7 | 35 | 11320 | 40 |
| 15 | 50 | 8365 | 17 |
| 25 | 65 | 8735 | 21 |
| 28 | 70 | 8665 | 20 |
| 34.5 | 90 | 8820 | 22 |
| 46 | 120 | 8810 | 21 |
| 69 | 175 | 8245 | 16 |

As can be seen, the permittivity of the comformable stress control material should be at least about 16. Since the most common voltage range is 15 to 69 kV, the preferred value for the permittivity is greater than 22, and most preferably is greater than 25.

The maximum electrical stress along the outer surface of the termination sleeve 12 adjacent to either the end of the cable shield 30 or the end of the stress controlling compound 20 is affected by many parameters. The relationship to predict this maximum stress is:

$$S_{external\ maximum} = (V/(R \ln (R/r)))B$$

where:

$$B = 0.585 + 1.76 \times 10^{-3} \epsilon_p - 2.43 \times 10^{-3} \epsilon_t + 7.32 \times 10^{-5} l_p - 4.45 \times 10^{-2} t_t - 3.39 \times 10^{-2} t_p - 4.45 \times 10^{-5} \epsilon_p l_p$$

where:

$\epsilon_p$ is the conformable stress control material's permittivity;

$\epsilon_t$ is the stress control tube's permittivity;

$l_p$ is the length of the conformable stress control material over the cable insulation in millimeters;

$t_t$ is the thickness of the stress control tube in millimeters; and $t_p$ is the thickness of the conformable stress control material in millimeters.

This relationship assumes a thickness of the termination sleeve 12 of about 2 mm. This thickness being the thinnest which will withstand voltage breakdown through the sleeve 12 to conserve material. Increased thickness of the sleeve 12 will also reduce stress at the outer surface of the sleeve 12.

The maximum permissible external stresses, S, must be below a level which would cause electrical breakdown of air during impulse conditions. The impulse breakdown strength for terminations was found to be between about 3000 and 9200 Volts/mm. The preferred embodiment should maintain stress at required impulse levels at about 3150 Volts/mm. This factor allows a maximum quantity for B to be calculated. The maximum permissible values for B at Voltages of interest are listed in the table below:

| Voltage Class (kV) | Lightning Impulse BIL (kV) | V/(R ln (R/r))$_{MAX}$ for 2500 MCM (V/mm) | B$_{(MAX)}$ for V$_{BD}$ = 9200 V/mm |
|---|---|---|---|
| 5.0 | 75 | 800 | .292 |
| 8.7 | 95 | 780 | .300 |
| 15 | 110 | 465 | .499 |
| 25 | 150 | 510 | .456 |
| 28 | 175 | 550 | .423 |
| 34.5 | 200 | 500 | .470 |
| 46 | 250 | 465 | .502 |
| 69 | 350 | 420 | .558 |

From the relationship for B given above it can be seen that increases in the permittivity of the conformable stress control material 20 and the length of the conformable stress control material 20 tend to increase the stress at the outer surface of the sleeve 12, although this is offset somewhat by the last term of the relationship for B, wherein it can be seen that the product of the permittivity and length of the conformable stress control material 20 tends to decrease this stress. Increases in the permittivity and thickness of the stress control tube 18 both tend to decrease the stress at the outer surface of the sleeve 12, and strongly so. As stated above, increased thickness of the termination sleeve 12 will also reduce the stress at the outer surface of the sleeve 12. However, this thickness is maintained at the minimum required to prevent breakdown of the sleeve 12 itself, approximately 2 mm, since the silicone from which the sleeve 12 is made is relatively expensive.

In practice, it is preferred that the thickness of the conformable stress control material 20 be at least 1 mm and most preferably between 2 and 3 mm to ensure that the material 20 completely fills the step at the cut end of the shield 30. The length of the conformable material 20 is at least 10 mm and preferably 25 to 50 mm along the cable insulation 28, in addition it is preferred that the conformable material extend about 10 mm on top of the cable shield 30 to ensure intimate contact with the shield 30, although this extension is not necessary so long as there is contact between the conformable stress control material 20 and the cable shield 30.

In a first embodiment of the invention, wherein stress controlling compound is positioned only adjacent the cut end of the cable shield 30, the stress control tube 18 is preferably about 60 mm long, it being found that a longer length has no further effect for tube 18 permittivities of less than 50. To avoid limiting the range of cable sizes with which the stress control termination can be used, the stress control tube 18 should not extend beyond the cut end of the cable insulation 28 and should not extend beyond the cut-back point of any further layers (for example, any metal shielding) above the cable shield 30. The thickness of the tube 18 is preferably at least 1 mm and most preferably between 2 and 3 mm.

Manipulation of these various parameters permits one to predict, for example, the necessary permittivity of the stress control tube 18 to be determined based on dimensions given or allows one to predict the dimensions the two stress control components must assume for given permittivities of the materials.

The use of the two component stress control system described above consisting of the conformable stress control material 20 and the stress control tube 18 greatly improves stress control over approaches in the past, and so permits either improved electrical performance for a give termination length or allows a reduction in termination length (about 40% of prior devices) at a given performance level. Of course, these advantages may be combined to produce a somewhat shorter termination with improved electrical performance. Since all components may be loaded on the core 14 of the termination assembly 10, application of the components is a one-step process and so is very economical and convenient.

The use of the two component stress control system described above (having conformable stress control material in contact with the end of the cable shield and extending along the cable insulation, and then covered by a polymeric stress control tube) so greatly improves stress control over prior art approaches that the stress adjacent the lug becomes the area of highest stress. For example, in a termination without stress control the stress adjacent the cut cable shield can be approximately 100 times as great as the stress at the lug end of the termination, perhaps 1000 kV/cm at the cut shield and 10 kV/cm at the lug end. The two component stress control system is effective in reducing the stress adjacent the cut shield to the point where the surface stress at the lug end is the predominate stress on the surface of the termination.

Until the introduction of the two component stress control system, there was no interest in addressing stress control at the lug end of the termination, because the stress adjacent the lug was small compared to the stress adjacent the cut shield. However, the large reduction in stress adjacent the cut shield allows stress control adjacent the lug to be addressed. Stress control adjacent the lug becomes important because the shorter termination lengths which are possible with the two component stress control system cause electrical stresses in the vicinity of the lug to rise to a level which may be significant. (It should be noted that the level of stress near the lug is still low when compared to the level of stress which existed in the termination prior to the introduction of the two component stress control system disclosed above).

Prior art terminations, including the inventive termination shown in FIGS. 1–3, utilize a silicone sealing compound 40 adjacent the lug end of the termination to remove air voids around the lug and to provide a weather tight seal. It has been discovered that by replacing the silicone sealing compound 40 with the stress control compound disclosed herein, electrical stress adjacent the lug is significantly reduced. In particular, this second embodiment of the inventive termination having a first region of stress control material 20 (in contact with the cut end of shield 30) and a second region of stress control material 21 (in cotact with the cut end of the cable insulation 28 and lug) exhibits improved AC withstand performance and impulse withstand performance.

Figure 6:
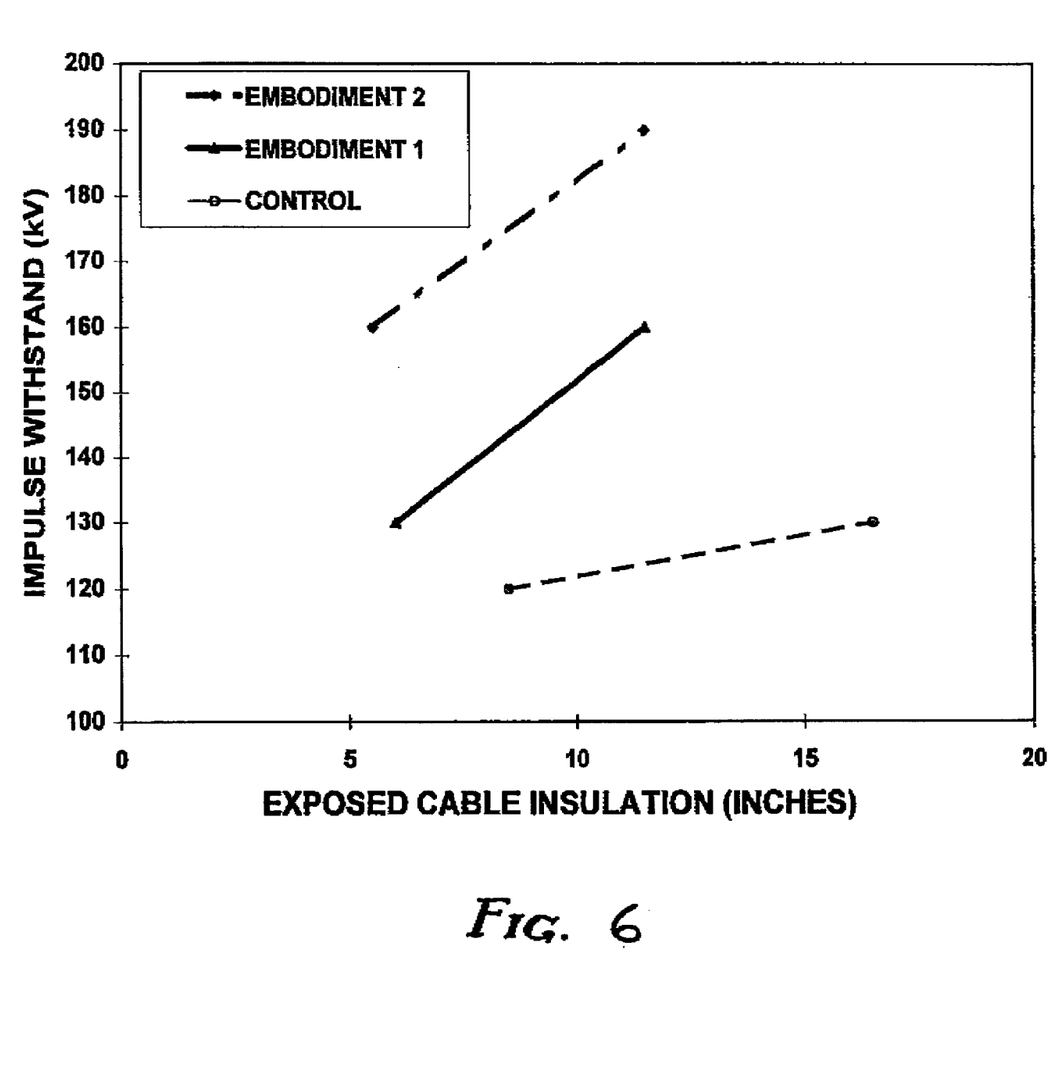
FIG. 6 is a graph showing impulse withstand test results for tubular terminations with and without the use of a stress control compound in accordance with the present invention.
Figure 7:
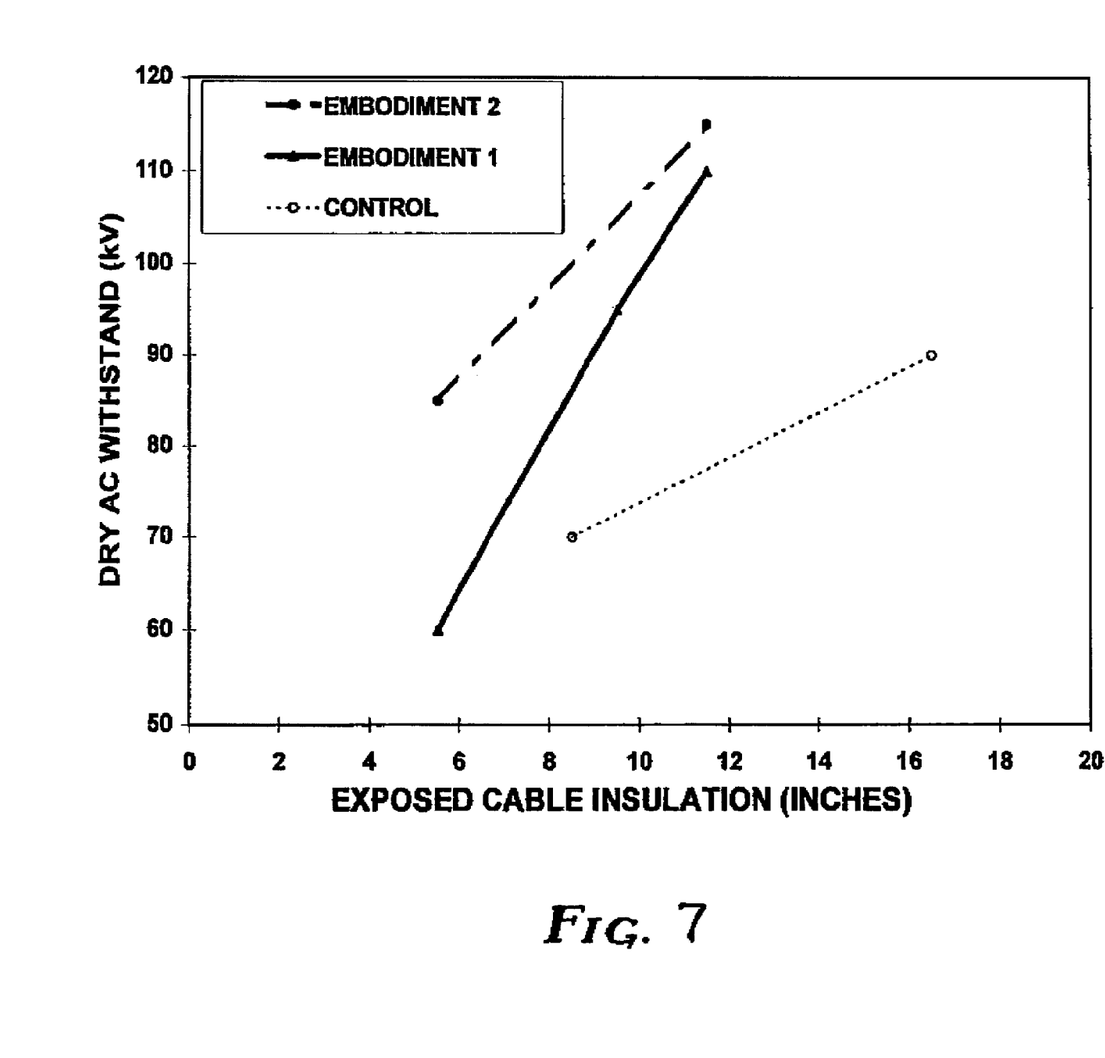
FIG. 7 is a graph showing dry AC withstand test results for tubular terminations with an without the use of a stress control compound in accordance with the present invention.

The levels of improved performance exhibited by the first and second embodiments of the inventive terminations are illustrated in FIGS. 6 and 7.

FIGS. 6 and 7 compare performance of a tubular termination without stress control compound (Control), with conformable stress control compound adjacent the cut end of the cable shield 30 only (Embodiment 1), and with conformable stress control compound adjacent to both the cut end of the shield 30 and the cut end of the insulation 28 and lug (Embodiment 2). A stress control tube is used in all examples. Although the graphs illustrate performance of tubular terminations, similar relative performance improvements would be expected with skirted terminations.

As can be seen from FIGS. 6 and 7, the introduction of first region of stress control compound 20 adjacent the cut end of shield 30 produces superior performance to a termination without stress control compound, and use of second region of stress control compound 21 adjacent the cut end of insulation 28 and lug results in a termination which exhibits even better performance for a given termination length. Accordingly, terminations may be made shorter for a given performance level.

Figure 4:
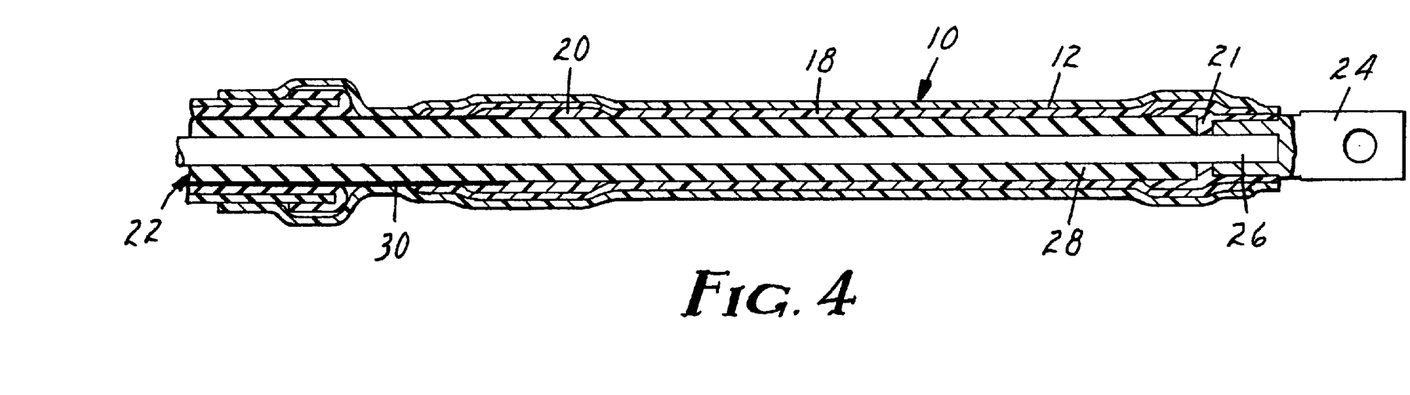
FIG. 4 is a cross-sectional view of an alternate embodiment of the stress control termination sleeve of the present invention as applied to an electrical power cable.
Figure 5:
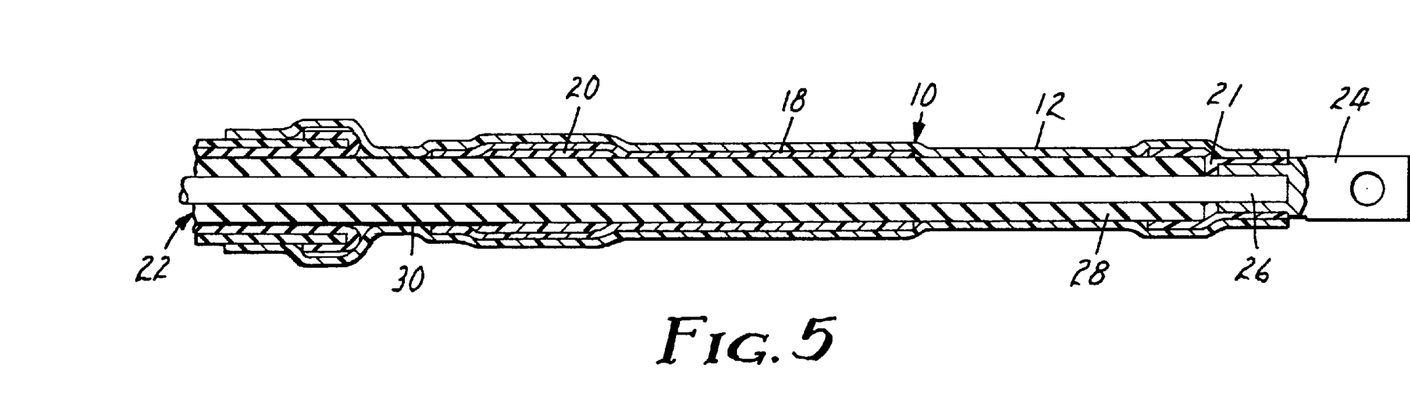
FIG. 5 is a cross-sectional view of yet another alternate embodiment of the stress control termination sleeve of the present invention as applied to an electrical power cable.

It will be recognized that multiple variations of the second embodiment of the inventive termination are possible, depending upon the particular application of the termination. In particular, the polymeric stress control tube 18 may be omitted from the termination entirely (not shown), or may extend between the first and second regions of stress controlling material 20, 21, or may be disposed over only one or both of the regions of conformable stress control material 20, 21. FIG. 4 shows the stress control tube 18 extending between the first and second regions of stress control material 20, 21, while FIG. 5 shows the stress control tube 18 extending only over the first region of stress control material 20. The first and second regions of stress controlling material 20, 21 may also be extended through the termination such that the first and second regions 20, 21 contact each other (not shown).

As described above, the conformable stress control material is preferably comprised of a blend of epihalohydrin polymers and insulating polymers having an electrical dissipation factor of less than 1, and has a permittivity $\in_p$ of at least about 16 and preferably between about 20 and 50.

The use of the stress control system described above consisting of the two regions of conformable stress control material greatly improves stress control over approaches in the past, and so permits either improved electrical performance for a give termination length or allows a reduction in termination length at a given performance level. Since all components may be loaded on the core 14 of the termination assembly 10, application of the components is a one-step process and so is very economical and convenient.

The invention claimed is:

1. A termination for an electrical power cable including an inner conductor, electrical insulation surrounding the conductor and a semi-conductive shield surrounding the insulation, wherein the shield is removed to a predetermined length and the insulation is removed to a lesser predetermined length to expose the conductor, the termination comprising:

a first region of relatively high permittivity conformable stress control material in contact with a cut end of the cable shield and extending along the cable insulation;

a second region of relatively high permittivity conformable stress control material disposed in contact with a cut end of the cable insulation; and a polymeric electrically insulating layer extending from a first end of the termination to a second end of the termination, the electrically insulating layer disposed over said first and second regions of relatively high permittivity conformable stress control material.

2. The termination of claim 1, further comprising:

a polymeric stress control tube extending between said first and second regions of conformable stress control material.

3. The termination of claim 1, further comprising:

a polymeric stress control tube disposed over said first region of conformable stress control material.

4. The termination of claim 1, further comprising:

a polymeric stress control tube disposed over said second region of conformable stress control material.

5. The termination of claim 1, wherein the first and second regions of conformable stress control material contact each other.

6. The termination of claim 1, wherein the permittivity $\in_p$ of said conformable stress control material is at least about 16.

7. The termination of claim 1, wherein the permittivity $\in_p$ of said conformable stress control material is between about 20 and 50.

8. The termination of claim 1, wherein the conformable stress control material is comprised of a blend of epihalohydrin polymers and insulating polymers having an electrical dissipation factor of less than 1.

* * * * *